Sept. 12, 1933.  A. V. D. WILLGOOS  1,926,736
CYLINDER CONSTRUCTION FOR AIRCRAFT ENGINES
Filed Oct. 3, 1930  2 Sheets-Sheet 1

INVENTOR
A.V.D.Willgoos.
BY
Joseph K. Schofield
ATTORNEY

Sept. 12, 1933.  A. V. D. WILLGOOS  1,926,736
CYLINDER CONSTRUCTION FOR AIRCRAFT ENGINES
Filed Oct. 3, 1930  2 Sheets-Sheet 2

INVENTOR
A.V.D.Willgoos
BY Joseph P. Schofield
ATTORNEY

Patented Sept. 12, 1933

1,926,736

UNITED STATES PATENT OFFICE 1,926,736

CYLINDER CONSTRUCTION FOR AIRCRAFT ENGINES

Andrew V. D. Willgoos, West Hartford, Conn., assignor to The Pratt & Whitney Aircraft Company, East Hartford, Conn., a corporation of Delaware Application October 3, 1930. Serial No. 486,094

17 Claims. (Cl. 123—173)

This invention relates to cylinder constructions for internal combustion engines and particularly to a construction adapted for liquid cooled aircraft engines.

An object of the invention is to provide a cylinder for internal combustion engines which will be exceedingly light in weight, adapted to be liquid cooled and to be made up of simple parts easily assembled and rigidly retained in assembled relation.

One feature which enables me to accomplish the above object is that the cylinder comprises a structure of cylindrical form preferably having a transverse integral wall within an intermediate portion so that recesses of different depths are provided within the cylindrical member upon opposite sides of the wall.

Another object of the invention is to provide a valve supporting and guiding member inserted within and permanently retained within one of the recesses, this member preferably having passages through which a cooling liquid may be circulated.

Another object of the invention is to provide an improved jacket surrounding a portion of the cylinder, this jacket being permanently secured to the cylinder at its opposite ends as by brazing or welding to form a space within which a cooling liquid may be admitted and circulated.

Another feature of the invention accomplished by the above named construction is a continuous circulation of cooling liquid within the jacket and within spaces formed in the valve supporting member, openings being provided within the cylindrical member for the cooling liquid to pass from the space within the cylinder jacket to the recess within which the valve supporting member is mounted.

A still further object of the invention is to provide a complete built-up cylinder construction, the members of which may be permanently retained together by copper brazing or welding within a hydrogen or other non-oxidizing atmosphere.

And finally it is an object of the invention to provide a cylinder construction adapted to be clamped to a housing member within a suitable recess and in a manner to securely retain the cylinder therein and form a tight joint between intake and exhaust openings within the cylindrical member and the housing member.

With the above and other objects in view, my invention includes the features of construction and operation set forth in the following specification and illustrated in the accompanying drawings.

In the accompanying drawings annexed hereto and forming a part of this specification, I have shown my invention embodied in a cylinder construction adapted for an internal combustion engine of the straight line type, but it will be understood that the invention can be otherwise embodied and that the drawings are not to be construed as defining or limiting the scope of the invention, the claims appended to this specification being relied upon for that purpose.

Figure 1:
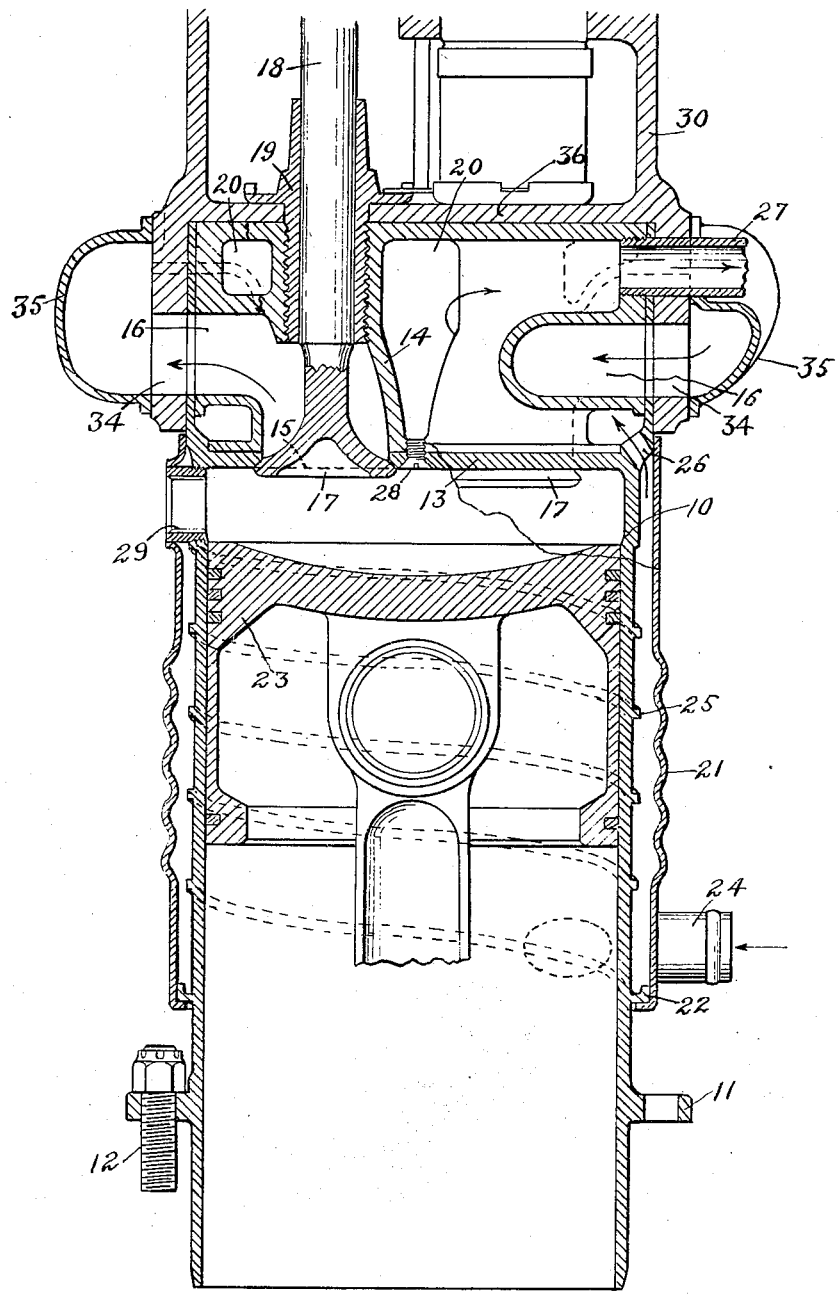
Figure 1 is a central longitudinal section showing one cylinder assembly.

In the above mentioned drawings I have shown but one embodiment of the invention which is now deemed preferable, but it is to be understood that changes and modifications may be made within the scope of the appended claims without departing from the spirit of the invention.

Briefly and in its preferred aspect, my invention may include some or all of the following principal parts: A cylindrical member preferably having a transverse wall formed integrally therewith at an intermedite portion of the length of the cylinder; a suitably spaced jacket or sleeve surrounding intermediate portions of the length of the cylinder from a position adjacent the transverse wall; a supporting member inserted within the recess at one end of the cylindrical member formed by the transverse wall and preferably engaging the transverse wall within which may be mounted valve guiding means and their conduits for the intake and exhaust of the gases; and a housing member within which the end of the cylindrical member containing the supporting member may be inserted and retained fixedly in position.

Referring more in detail to the figures of the drawings, I provide a generally cylindrical member 10 formed from one piece, preferably from a suitable forging. A flange 11 adjacent one end of the cylindrical member is provided so that it may be suitably secured as by studs or bolts 12 to an engine crank case portion (not shown). An integral wall or diaphragm 13 extends transversely through the cylinder 10 at an intermediate portion of its length, preferably and as shown this transverse wall being relatively near one of the ends. Housed within the shallower recess thus formed at one end of the cylindrical member 10 is mounted a valve supporting and guiding member 14. This member 14 contacts at its periphery with the finished inner surface of the cylindrical member 10 and upon its lower or inner surface with the upper surface of the transverse wall 13. The transverse wall 13 is provided with spaced circular openings 15 therethrough in alinement with openings 16 provided within the inserted valve supporting member 14. Within these openings 15 through the transverse wall 13 intake and exhaust valves 17 may operate, their stems 18, one only of which is shown, being slidably mounted within suitable guide members 19 retained within the inserted member 14. The openings 16 within the valve supporting member 14 also form passages for the intake and exhaust of the gases employed in the engine. Spaces 20 within the inserted member 14 enable a cooling liquid to be circulated about the valve guiding members 19.

Surrounding the intermediate portions of the cylindrical member 10 from a point adjacent the transverse wall 13 and extending toward the securing flange 11 is a thin jacket 21, one end being fastened to the cylinder 10 at a slightly enlarged cylindrical portion adjacent the transverse wall 13 and the opposite end being bent around or otherwise secured to a small flange 22. As shown, this jacket 21 provides an annular space surrounding the cylinder 10 at that portion within which the piston 23 of the engine contacts with the cylinder walls. To this space is adapted to be admitted a cooling liquid, as through the connection 24 shown in Fig. 1 at the lower end of the jacket 21. To facilitate circulation of the cooling liquid, the connection 24 extends tangentially of the jacket 21 so that the liquid upon entering is given a circular motion. A slight projection 25 outstanding from the cylindrical member 10 extends helically from one end of the space within the jacket 21 to the other. Also the jacket 21 may be spirally corrugated, as shown, to aid in forming a helical circulating path for the cooling liquid.

Extending through the wall of the cylindrical member 10 from the space enclosed within the jacket 21 to the recess above the transverse wall 13 and into the open spaces 20 within the valve supporting member 14 are a plurality of openings 26, one only of which is shown. Extending through the valve supporting member 14 and through the wall of the cylindrical member 10 adjacent one end thereof is a connection 27 enabling the cooling liquid to be withdrawn from the cylindrical member 10. It will be seen from the above that by virtue of the spiral projection 25 and also by the tangential position of the connection 24 through which cooling liquid is supplied, that this cooling liquid has a generally circular movement about the heated walls of the cylinder 10 and that finally this liquid passes through the openings 26 into the spaces 20 within the valve supporting member 14 and is withdrawn from the opposite end of the cylinder through connection 27.

To secure the jacket 21 to the outside of the cylindrical member 10 and also to secure the valve supporting and guiding member 14 within the recess at one end of the cylindrical member, copper brazing or welding is employed. Strips or rings of copper, or copper in powdered form, is placed about and temporarily retained in place adjacent all of the joints to be formed between the cylindrical member 10 and the jacket 21 and between the valve supporting and guiding member 14 and the cylindrical member 10. With the copper thus retained temporarily in position, the entire assembly is suitably heated within a non-oxidizing atmosphere of hydrogen or hydrogen and nitrogen to a point just sufficient to melt the copper, causing it to flow throughout the joints by capillary attraction, thus making permanently brazed or copper welded joints. To retain the valve supporting member 14 closely against a surface of the transverse wall 13 during the welding operation, a small screw 28 may be employed extending through the transverse wall 13 and threaded into the lower portion of the supporting member 14.

The connection 24 for admitting the cooling liquid to the space within the jacket 21 may also be secured by the copper brazing operation in the same manner. To accommodate spark plugs, or injection nozzles, tubes 29 may be employed, one only being shown, threaded into the wall of the cylindrical member 10. This tube 29 in addition to being threaded may also be brazed, as above described, both to the cylindrical member 10 and to the jacket 21.

Figure 2:
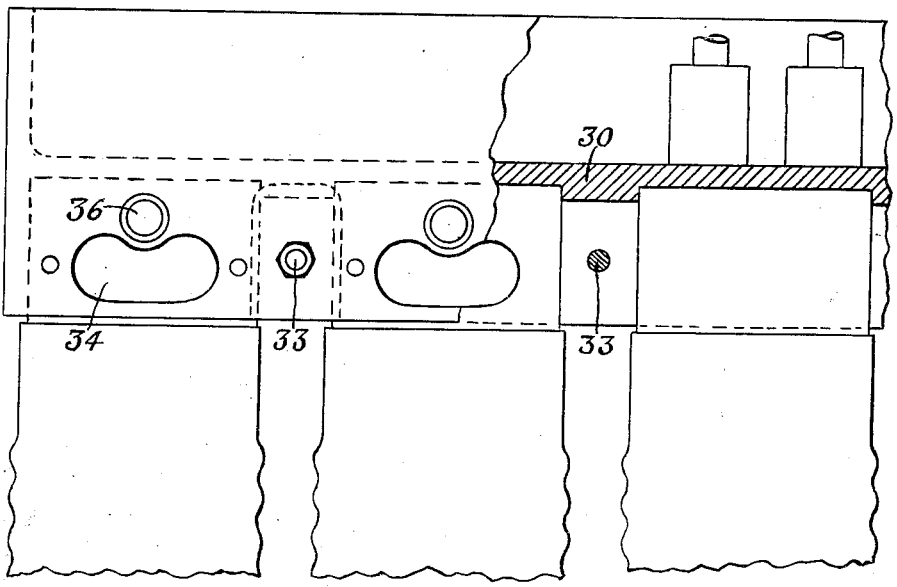
Fig. 2 is a fragmentary view of a side elevation of an engine provided with several cylinders of the type shown in Fig. 1, a part of the figure being broken away to more clearly show the construction.
Figure 3:
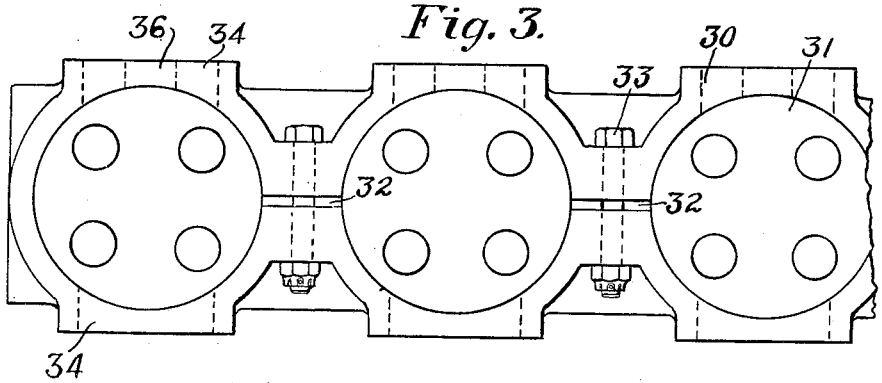
Fig. 3 is a bottom view of the frame or housing member showing the clamping means for the cylinder assemblies.

In order to employ the cylinder assemblies above described in multiple in an engine, they may be secured detachably within a housing or frame member 30, one end only of which is shown in Figs. 2 and 3. This member 30 has formed upon one side or face spaced recesses 31 sufficiently deep to retain the end of the cylindrical member 10 to a depth corresponding substantially to the recess for the valve supporting and guiding member 14. Portions of this housing member 30 may be split, as shown clearly at 32 in Fig. 3, bolts 33 being provided extending from opposite sides of the member 30 so that by tightening these bolts 33 the cylindrical member 10 will be held rigidly in position. By means of the arrangement of bolts 33 for the split portions of the housing member 30, the side walls thereof are drawn tightly against the cylindrical member 10 adjacent the openings 16 for the intake and exhaust passages. The joint formed therefore is sufficiently tight to prevent escape of the combustible or burnt gases around these joints.

Openings 34 upon opposite sides of this frame member 30 are in alinement with the openings 16 formed within the cylindrical member 10 and the supporting member 14. Each of the cylindrical members 10 therefore is properly alined for the intake and exhaust manifolds 35 of the engine which may be secured directly to the sides of the housing or frame member 30. Also openings 36 for the passage of the cooling liquid are provided through the frame or housing member 30 properly alined with the corresponding openings through the cylindrical member for the connections 27.

The frame member 30 may be further secured rigidly to the cylinder assembly by the disposition of the valve guiding members 19. It will be noted that these guiding members 19 have a central flange portion which, with the member in position, contacts with a web portion 36 of the member 30. The depending end of the guiding member 19 is threaded and enters a threaded hole within the supporting member 14. The frame member 30 is therefore forced down and held rigidly against the upper surface of the supporting member 14 by the valve guiding member 19.

What I claim is:

1. A cylinder construction comprising a cylindrical member having an internal transverse wall at an intermediate portion thereof, a combustion chamber on one side of said transverse wall, and a valve supporting member on the opposite side thereof housed within said cylindrical member.

2. A cylinder construction comprising a cylindrical member having a valve guiding and supporting member inserted and housed completely within one end, and means to permanently secure said supporting member in position.

3. A cylinder construction comprising in combination, a cylindrical member having an internal transverse wall at an intermediate portion thereof, a cylinder jacket surrounding said member upon one side of said wall, and a valve supporting member inserted and housed within the cylindrical supporting member upon the opposite side of said wall.

4. A cylinder construction comprising in combination, a hollow cylindrical member, a cylinder jacket surrounding a portion of said member, and a valve supporting member inserted and housed within one end of the cylindrical member.

5. A cylinder construction comprising in combination, a cylindrical member having an internal transverse wall, a cylinder jacket surrounding said cylinder on one side of said wall, a valve supporting and guiding member inserted and housed within the cylinder on the opposite side thereof, and liquid circulating means between said cylinder and jacket and within said inserted member.

6. A cylinder construction comprising in combination, a cylindrical member having a transverse wall dividing said cylinder into two unequal recesses, a cylinder jacket surrounding said cylinder on one side of said wall, a valve supporting and guiding member inserted and housed within the cylinder on the opposite end thereof, and continuous liquid circulating means between said cylinder and jacket and within said inserted member.

7. A cylinder construction comprising in combination, a cylindrical member having an internal transverse wall at an intermediate portion thereof, a combustion chamber formed on one side of said transverse wall, a valve supporting member inserted within the opposite end of said cylinder, and a housing member having a recess within which an end of said cylindrical member extends.

8. A cylinder construction comprising in combination, a cylindrical member, a combustion chamber formed within one end of said member, a valve supporting member inserted and housed within the opposite end of said member, and a frame member having a recess within which an end of said cylindrical member extends.

9. A cylinder construction comprising in combination, a cylindrical member having a valve supporting member inserted and housed within one end, and a frame member surrounding said end of said cylindrical member to enclose said valve supporting member and the end portion of said cylindrical member.

10. A cylinder construction comprising in combination, a cylindrical member having a valve supporting member inserted and housed within one end, a frame member surrounding said end of said cylindrical member to enclose said valve supporting member, and clamping means to hold the walls of said frame member against said cylindrical member.

11. A multiple cylinder construction comprising in combination, a plurality of individual cylindrical members, valve supporting members therein, said cylindrical and supporting members having alined openings therein, a frame member having recesses within one side for said cylindrical members, said frame member also having openings alined with said openings within said cylindrical and supporting members, and means to individually secure said cylindrical members within said recesses.

12. A cylinder construction comprising in combination, a cylindrical member, a valve supporting member inserted and housed within one end, said cylindrical member and supporting member having alined openings, a frame member surrounding a portion of said cylindrical member and enclosing said supporting member, said frame member having openings alined with said openings in said cylindrical member and supporting member, and means to clamp said frame member to said cylindrical member.

13. A cylinder construction comprising in combination, a cylindrical member, a valve supporting member inserted and housed within one end, means to permanently connect said supporting member to said cylindrical member, a frame member surrounding a portion of said cylindrical member and enclosing said supporting member, and means to detachably clamp said frame member to said cylindrical member.

14. A cylinder construction comprising in combination, a cylindrical member, a valve supporting member inserted therein, a housing member having a recess within which an end of said cylindrical member extends, and a valve guiding member extending through a portion of said housing member and being secured to said supporting member.

15. A cylinder construction comprising in combination, a cylindrical member, a valve supporting member inserted therein, a housing member having a recess within which an end of said cylindrical member extends, a valve guiding member extending through a portion of said housing member and having a flange portion bearing against a surface thereof, and means to secure said guiding member to said supporting member whereby said supporting and housing members are held rigidly together.

16. A multiple cylinder construction comprising in combination, a plurality of individual cylindrical members, a frame member having recesses within one side thereof, means to clamp said frame member to said cylindrical members, said means comprising bolts extending transversely through said frame member in a plane normal to the axes of said cylindrical members, whereby opposite sides of said recessed portion of said frame member are drawn against said cylindrical members.

17. A multiple cylinder construction comprising in combination, a plurality of individual cylindrical members, a frame member having cylindrical recesses within one side thereof and having their axes parallel to each other, means to clamp said frame members to said cylindrical member, said means comprising bolts extending transversely through said frame member between said cylindrical members in a plane normal to the axes of said cylindrical members, whereby opposite sides of said recessed portion of said frame member are drawn against said cylindrical members.

ANDREW V. D. WILLGOOS.